Feb. 25, 1941.  O. A. ROSS  2,232,829
SYSTEM FOR PRODUCING RECORDS OF RECORDING METER READINGS
Filed May 14, 1936
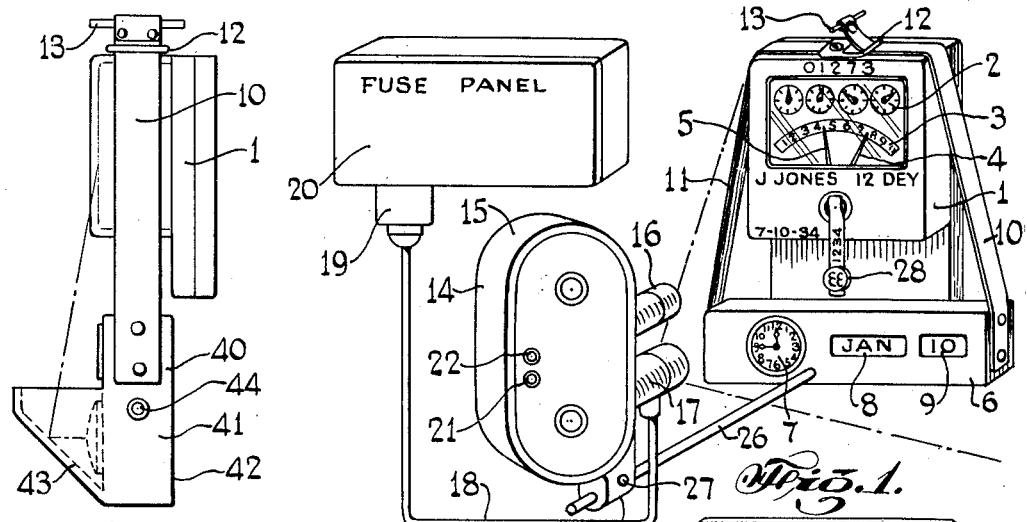
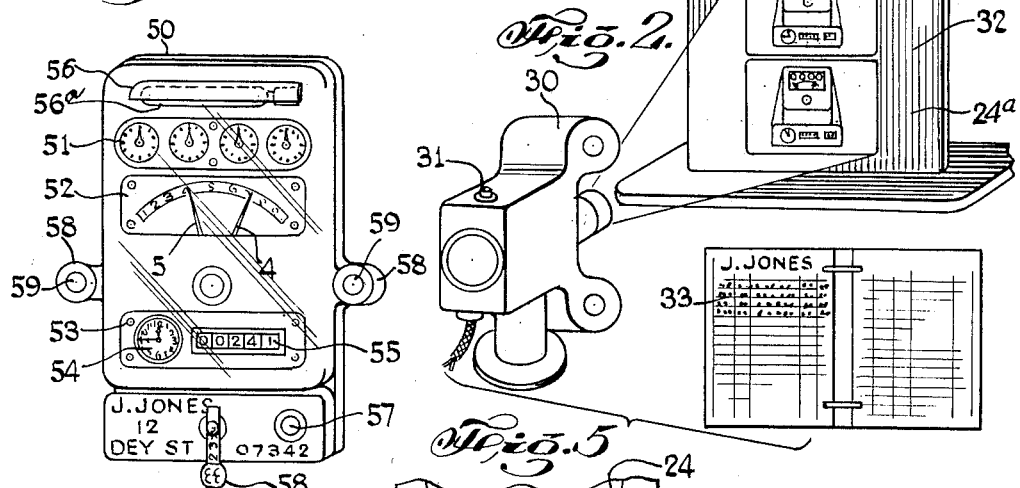
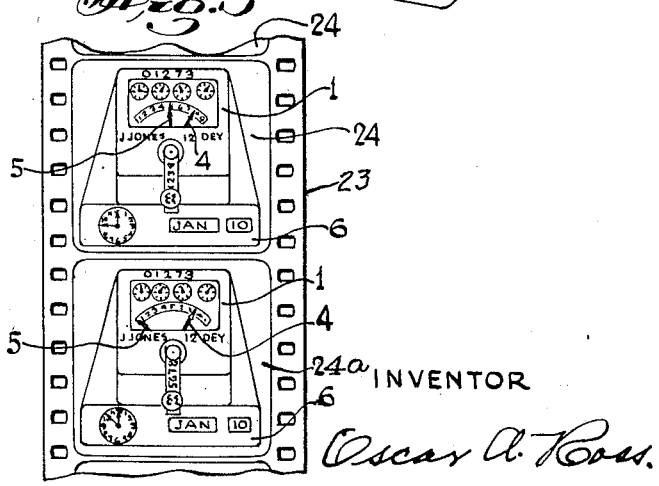
INVENTOR
Oscar A. Ross.

Patented Feb. 25, 1941

2,232,829

UNITED STATES PATENT OFFICE 2,232,829

SYSTEM FOR PRODUCING RECORDS OF RECORDING METER READINGS

Oscar A. Ross, New York, N. Y.

Application May 14, 1936, Serial No. 79,800

4 Claims. (Cl. 234—58)

This invention relates to a system for producing records of recording meter readings and more particularly to recording meters furnished by public service utilities.

When recording the consumption of electrical energy or other fluid flow consumed by the public it is customary for employees of said utilities to read the meters visually thereafter recording said readings in suitable books or cards, this record being made on the premises of the consumer. Where maximum demand meters are installed it is also customary for said employees to re-set the maximum demand indicators. Since both the reading of meters and the re-setting of the demand meters depend upon the human element for correctness, errors can and are made by said employees, leading to disputes between said utilities and said consumers since the utility cannot positively prove the correctness of the reading by their employees.

This invention comprehends the furnishing of methods for furnishing positive proof of meter readings including the dates and time at which said readings are taken. In this accomplishment the invention comprehends the photographic recording of a meter reading onto film before the demand indicator is re-set and the old seal broken, and also photographically recording said reading after said demand indicator has been not only re-set but re-sealed in the zero position, said photographic recording also indicating the name of the consumer, the number of the meter, the month and day thereof and the exact time at which said readings were recorded. After development of said film the records thereon are projected, either from the original negative which may be reversed to a positive during development, or from a print therefrom, for the purpose of making bookkeeping entries and bills of the amounts to be paid by the consumer.

The invention further comprehends novel apparatus for accomplishing the photographic meter reading recording system hereinbefore named, and further comprehends novel forms of meters for eventually replacing existing forms of meters for simplifying the operation of the system, said preferred form of meters including a lamp for illuminating the dials of said meter by depressing a button switch and also including an electrically operated clock and counter indicating lapsed days of 24 hours each.

Other advantages and novel features will be apparent as the description of the invention progresses and the novel and peculiar structure and modes of operation thereof will be pointed out in the specification and claims wherein—

Figure 1 is a perspective view of one mode of photographically recording the readings of a public service utility meter, and the peculiar devices employed in connection therewith. Fig. 2 is a perspective view of one mode of projecting said photographic record for bookkeeping entries and billing showing the apparatus associated therewith. Fig. 3 is a side elevational view of a modified form of an auxiliary calendar and clock device shown in Fig. 1. Fig. 4 is a preferred form of registering meter for eventually replacing present forms of meters. Fig. 5 is a portion of photographic film onto which the meter readings have been photographically recorded.

Referring to Fig. 1, demand meter 1, assumed to be on the consumers' premises, includes watt hour dials 2 and maximum demand dial 3 having maximum demand indicators 4 and 5. Auxiliary chronological unit 6 comprises a clock unit 7 and a calendar unit having a month indicator 8 and day indicator 9.

Said auxiliary unit is preferably checked for correctness at the premises of said utility and sealed before delivery to an employee designated for reading said meters, said employee being hereinafter termed meter reader. Auxiliary unit 6 further includes supporting straps 10 and 11 joined together by quick-acting buckle 12, the free end of strap 10 having a fixed pin preventing the complete removal thereof from buckle 12. The loop formed by said straps is sufficiently large to accommodate all sizes of meters installed by the particular utility using said auxiliary units.

Recording camera 14, preferably of the motion picture type, includes film and mechanism housing 15 having objective barrel 16 and may be of conventional form suitably modified to include light projecting unit 17, the light source of which is energized by an electrical conductor 18 adapted to be plugged into outlet 19 of fuse panel 20, the flow of energy to said unit 17 being controlled by push button 21. Push button 22 is arranged to expose a single frame 24 of film 23 (Fig. 5) each time said button is depressed. Said camera is further modified to include boss 24a adjustably supporting stop or distance rod 26 adjustably secured by screw 27 for establishing the proper focal distance between said camera and a meter, as 1.

Referring to Fig. 2, projector 30 of any conventional form is arranged to project motion picture film 23 and includes push button 31 adapted to advance said film a single frame each time said button is depressed, said film being projected onto screen unit 32 for observation by a person or persons duly assigned to enter said projected records into the record book 33, which may be by a billing machine of conventional form.

Referring to Fig. 3, a modified chronological unit 40 is shown similar to unit 6, but modified to include a light projecting unit 41 arranged to project light onto reflecting surface 43 and thence onto the dials of meter 1, and dials 7, 8 and 9 of said unit 40, push button 44 controlling the flow of energy to the lamp of said light projecting unit 41.

Referring to Fig. 4, showing a preferred form of electric meter 50 for use on consumers' premises, said meter includes conventional watt hour and maximum demand mechanisms (not shown) and dials 51 and 52 therefor. Said meter further includes a chronological unit 53 comprising electrically operated clock 54 and calendar indicating unit 55. Said clock is preferably connected to and operated by the synchronous motor employed in connection with a maximum demand register, thereby avoiding the necessity of adding a separate synchronous mechanism for operating said clock. The calendar indicating unit is preferably connected to and operated by said clock mechanism and is arranged to advance one digit every 24 hours. Said unit will therefore indicate the lapse of days between each meter reading when successive monthly readings are compared. Said meter further includes a light projecting unit 56 having lamp 56a arranged to be energized by push button 57 when photograph readings are to be taken or said meter inspected. Said meter further includes lugs 58 having openings 59 into which the distance rods as 26, may be inserted for properly aligning and spacing the camera recording unit 15 while meter readings are being recorded thereby. For use in connection with recording the readings of meter 50 camera 15 may be modified by the addition of 2 lugs as 25 one on each side thereof.

Referring to Fig. 5, showing a section of film 23 onto which meter readings have been photographically recorded, frame 24 indicates a photographic record of a meter reading prior to re-setting the demand register indicator and frame 24a indicates the photographic recording of the same meter after re-setting said demand register indicator to zero and sealing the same before said last named record was taken.

Whereas light projecting unit 17 on camera 15 has been shown as energized through cable 18, said unit may include suitable dry or other forms of batteries supported by said camera or the meter reader for energizing said unit upon depressing push button 21.

Whereas chronological unit 6 and camera 15 are shown as independent units, the distance rod 26 may be hinged between the ends thereof, one hinged portion being rigidly secured to said camera and the other hinged portion being secured to said unit, said unit being folded into mating engagement with said camera when not in use for recording purposes.

Whereas 2 push buttons as 21 and 22 are shown for energizing light projecting unit 17 and advancing the film in camera 15, this may be accomplished by the use of 1 button, the initial movement of which first energizes said unit and the final movement of which releases the film mechanism for advancing said film one frame.

*Operation Figs. 1, 2, 3, 4 and 5*

Referring to Figs. 1, 2, 3, 4 and 5, one manner of photographically recording meter readings is as follows; the meter reader suspends unit 6 from meter 1, taking care that seal 28 is placed in a position to show the serial number thereon. Conductor 18 is plugged into outlet 19 and camera 15 is held in the position shown, rod 26 abutting unit 6 for establishing a proper approximate focal distance between said camera and said meter. The buttons 21 and 22 are then depressed in succession, button 21 effecting the illumination of said meter and button 22 operating camera 15 for photographically recording the readings on said meters, including the readings on unit 6 and seal 28. The meter reader then removes seal 28, re-sets the proper demand register indicator to zero. The indicator restoring mechanism is then sealed with a new seal 28 in such a manner that the serial number of said new seal will be exposed for the photographic recording thereof. Thereafter the meter, including the unit 6 and the new seal 28 are again photographically recorded in the manner previously described. These two meter recordings form an undisputable record of the condition of said meter prior to and after re-setting the maximum demand register, and further include a record of the time and place at which said photographic records were made. In case of a dispute said photographic records can be produced as proof of the meter readings on which charges for consumption of public utility service have been billed to a consumer.

After film 23 is developed, it is projected as shown in Fig. 2 and from observation of said projection suitable bookkeeping entries are made in the consumer's account, these entries preferably being in the form of duplicate bills, to which may be added such other charges as may be due.

It will be noted by reference to Fig. 5 that frame 24 shows the old seal and both the maximum demand register indicators at maximum demand positions, whereas in frame 24a one of said indicators has been re-set to zero and the seal 28 displays a new serial number thereby indicating that a new seal has been inserted.

Referring to Figs. 2 and 5, it is to be understood that in preparing bookkeeping entries or statements for service rendered to consumers by a public service utility, that a comparison is made between the projected record and previously recorded meter readings, which may be entries made in record book 33, or may be projection of previously recorded records on film, for determining the service charge to be rendered.

It is also to be understood that whereas the preferred manner of bookkeeping is to prepare statements to be forwarded to said consumers at the time of observing said projected pictures, as 24 and 24a, that the records projected may be entered into suitable books of records, as for example book 33, and thereafter said statements prepared and forwarded to said consumers.

While I have shown my invention in the peculiar embodiments herein described, I do not however, limit myself to this construction, but claim any equivalent modification that will readily suggest itself to those skilled in the art.

I claim:

1. The method of producing records of public service meter readings wherein the meters include service consumption indicators and maximum service demand indicators which are normally sealed against restoration to the zero position, which involves photographing the service consumption indicators and the maximum service demand indicators including the seals of said meters as a single picture onto light sensitive film, removing the seals and restoring the maximum demand indicators to the zero position and resealing said maximum service demand indicators with new seals, and again photographing said service consumption indicators and restored maximum service demand indicators including said new seals as another single picture adjacent said first named picture for forming a composite picture record disclosing the meter readings at the end of one service period and the beginning of a succeeding service period.

2. The method of producing records of public service meter readings wherein the meters include service consumption indicators and maximum service demand indicators which are normally sealed against restoration to the zero position, which involves photographing the service consumption indicators and the maximum demand service indicators including the seals of said meters as a single picture onto light sensitive film, removing the seals and restoring the maximum service demand indicators to the zero position and resealing said maximum service demand indicators with new seals, again photographing said service consumption indicators and restored maximum service demand indicators including said new seals as another single miniature picture on said film adjacent said first named picture for forming a composite picture record disclosing the meter readings at the end of one service period and the beginning of a succeeding service period, and optically projecting said correlated pictures for comparison with previous similar records to determine the amount of service consumption registered by said meters during each of said periods.

3. The method of producing records of public service meter readings wherein the meters include service consumption indicators and maximum service demand indicators restorable to a zero position, which involves photographing both the service consumption and maximum service demand indicators as a single picture onto light sensitive film, restoring said maximum service demand indicators to their zero position and again photographing said service consumption and restored maximum service demand indicators as another single picture onto said film adjacent said first named picture for forming a composite picture record disclosing the meter readings at the end of one service period and the beginning of a succeeding service period, and optically projecting said correlated pictures simultaneously for comparison with previous similar records to determine the amount of service consumed during said periods.

4. The method of producing records of public service meter readings wherein the meters include meter identification data, service consumption indicators and maximum service demand indicators restorable to zero position, which involves photographing said meter data, service consumption indicators and maximum service demand indicators as a single picture onto light sensitive film, restoring said maximum service demand indicators to said zero position and again photographing said meter data, service consumption indicators and restored maximum service demand indicators as another single picture adjacent said first named picture to form a composite record disclosing the meter readings at the end of one service period and the beginning of a succeeding service period, and utilizing said composite picture record for comparison with previous similar records for determining the service charge to be rendered for service consumed during each of said periods.

OSCAR A. ROSS.